United States Patent [19]

Gorkiewicz

[11] 4,413,868
[45] Nov. 8, 1983

[54] RETRACTABLE RECEPTACLE SUPPORT MECHANISM

[76] Inventor: Mitchell F. Gorkiewicz, 619 E. Sixth St., Royal Oak, Mich. 48067

[21] Appl. No.: 225,431

[22] Filed: Jan. 15, 1981

Related U.S. Application Data

[63] Continuation-in-part of Ser. No. 185,339, Sep. 8, 1980.

[51] Int. Cl.³ .............................................. A47B 81/00
[52] U.S. Cl. .................... 312/211; 312/212; 312/273; 312/294; 248/282
[58] Field of Search ............... 312/211, 212, 294, 246, 312/273, 306, 325; 248/282, 283

[56] References Cited

U.S. PATENT DOCUMENTS

| | | | |
|---|---|---|---|
| 623,189 | 4/1899 | Smith | 248/282 |
| 742,210 | 10/1903 | Moreland | 248/282 |
| 1,908,831 | 5/1933 | Edward | 312/325 |
| 2,518,985 | 8/1950 | Geyh | 312/273 |
| 2,629,315 | 2/1953 | Schaar | 248/282 |
| 2,644,737 | 7/1953 | Davis | 312/212 |
| 2,937,602 | 5/1960 | Norris | 312/294 |
| 4,091,918 | 5/1978 | Soulakis et al. | 312/294 |

FOREIGN PATENT DOCUMENTS 2524407 12/1976 Fed. Rep. of Germany ...... 312/325
7412394 6/1975 Netherlands ...................... 312/325

Primary Examiner—Victor N. Sakran
Attorney, Agent, or Firm—Gifford, VanOphem, Sheridan & Sprinkle

[57] ABSTRACT

A retractable basket carrier with chain and sprocket mechanism or travel bar mechanism. A mechanism is provided in the alcove of a desk or similar space in a cabinet to move a carrier from an inner hidden position to an extended position which accesses a wastepaper basket or similar item carried by or depending from the carrier. The mechanism may be installed on either side of the opening in the desk for left or right hand operation and is easily placed in position in the desk with a mounting bracket. An actuator mechanism is installed at the front of the desk for extending the carrier by swing arm movement and to provide a stop for the rearward movement of the carrier. Either a ball chain mechanism or a travel arm with hubs is used to move the carrier. A wastebasket or other item may be supported from the carrier by a universal joint and is moved between the extended and inward positions with only a slight amount of force upon the actuating mechanism. The orientation of the container remains constant relative to the desk throughout the rotation of the support arm connected to the carrier.

12 Claims, 10 Drawing Figures

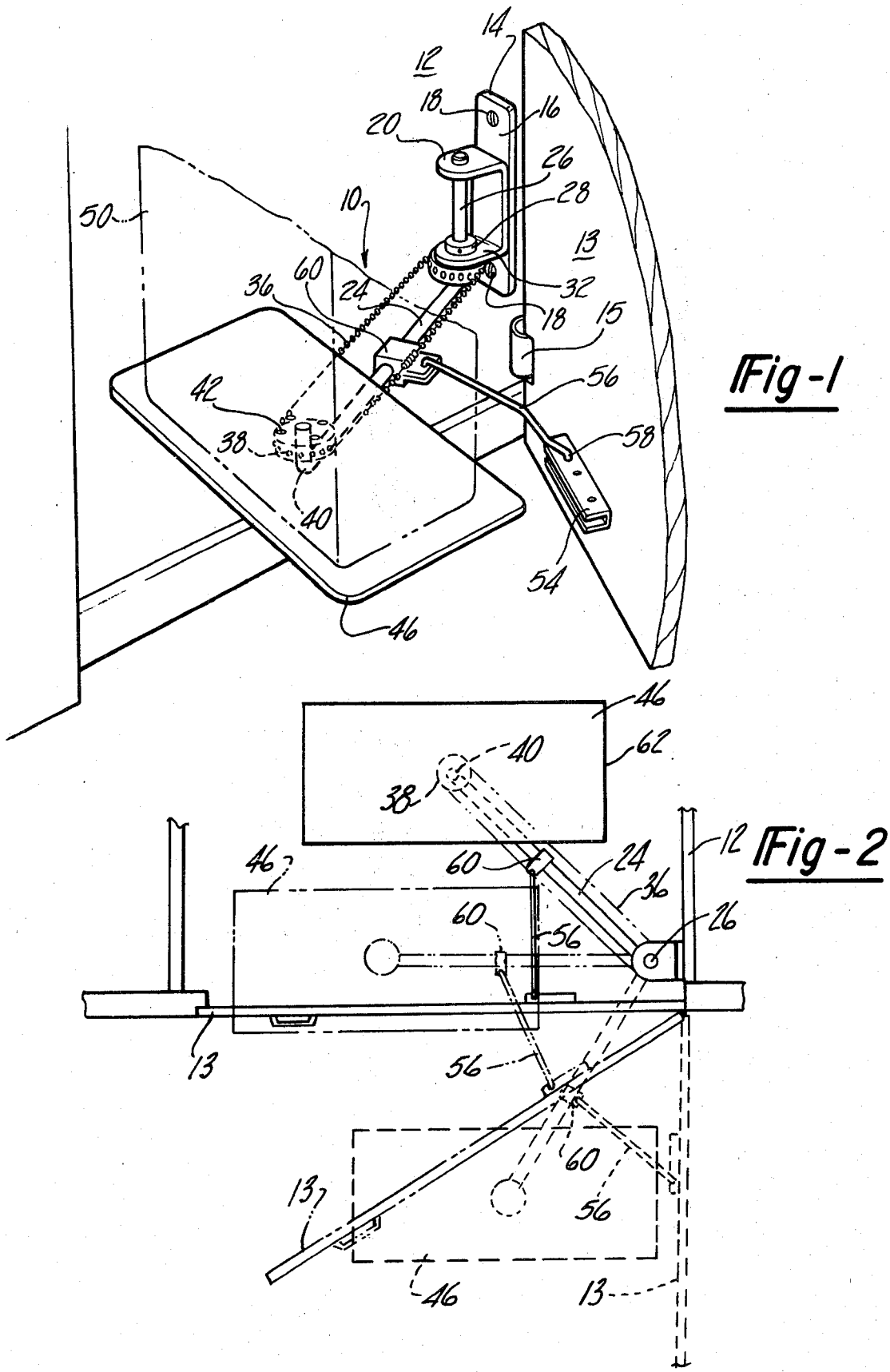

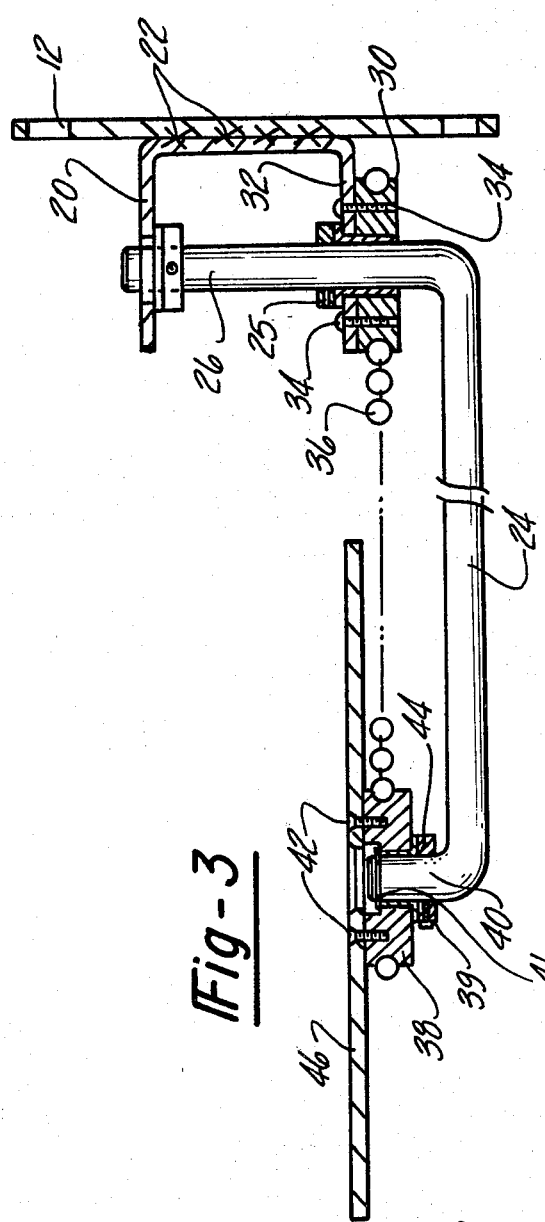
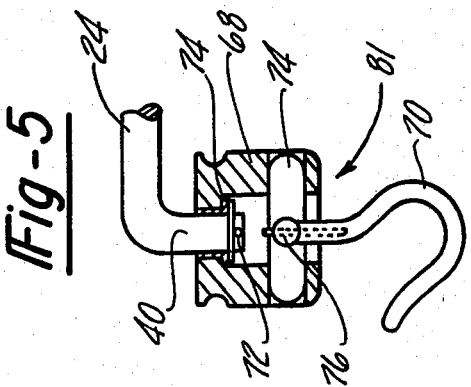
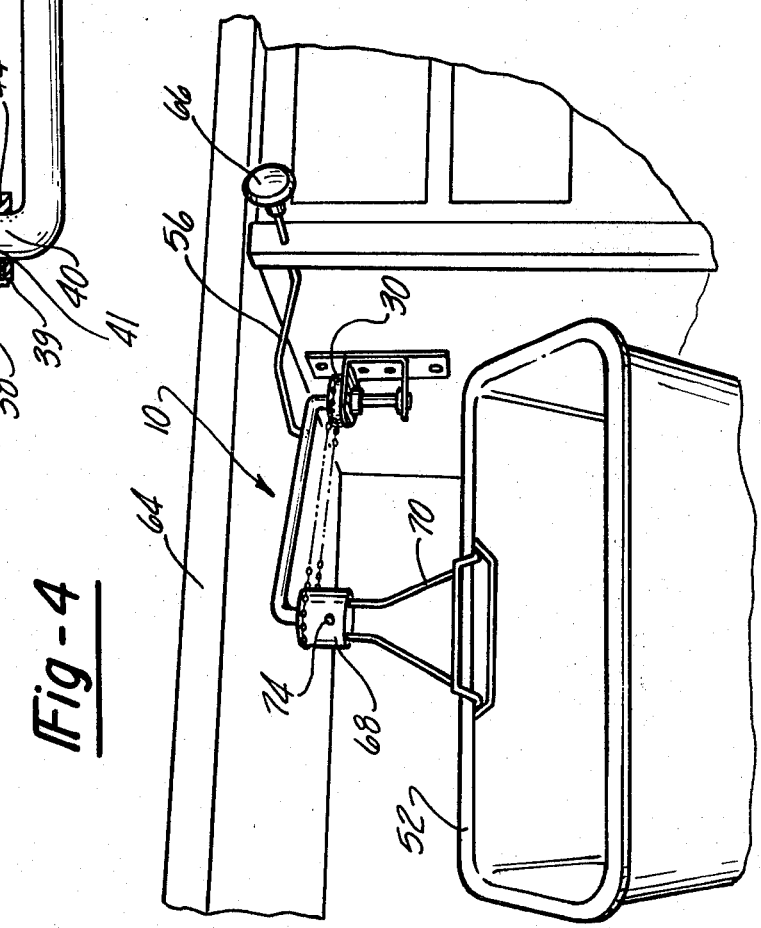

RETRACTABLE RECEPTACLE SUPPORT MECHANISM

CROSS-REFERENCE

This application is a continuation-in-part of my co-pending U.S. patent application Ser. No. 185,339 filed Sept. 8, 1980.

BACKGROUND OF THE INVENTION

1. Field of the Invention

The present invention relates to retractable mechanisms and supports for receptacles associated therewith, including chain and sprocket type mechanisms and waste receptacles for use in desks, cupboards, and other areas.

2. Description of the Prior Art

Receptacles used for storage or waste are frequently located in the corner of an office or work area. Such receptacles usually have a relatively short period of usage during the work day and are often inconveniently located or positioned so that they are difficult to empty or clean. Although such receptacles are necessary for occasional use, they are nevertheless often an obstruction when not in use.

It has been proposed in the past to use the space between the legs of a desk, or under cupboards, and in similar recesses, to locate a waste receptacle. However, this positioning of the receptacle makes it difficult for depositing waste therein and for removing the receptacle for emptying on a daily or weekly basis. My earlier U.S. Pat. No. 4,111,506 for carrying a wastebasket or similar item into and out of a recess, for example, a desk or a cupboard, was one form of a solution to the problem of positioning a wastebasket conveniently.

My co-pending U.S. patent application Ser. No. 185,339 shows an improved retractable scissors tong mechanism for use with wastebaskets and the like. Development of this type of invention has always been directed toward reducing the amount of pressure required to move the receptacle into and out of a recess. Research on such devices has also been directed toward decreasing the cost of such devices and facilitating the installation in a desk recess or cupboard.

The devices of my previous patent and patent application are a vast improvement over the practice of merely positioning a wastebasket in an inconvenient spot, but they do not include sufficient means for adjustment of the device to various recesses, door openings, and other dimensions of desks, cupboards, and the like.

SUMMARY OF THE INVENTION

The present invention overcomes the problem associated in the prior art with positioning of containers and is an improvement over my previous inventions. By my present invention, I have provided an apparatus for moving a container to various positions between the front and rear of a housing in a desk, cupboard, or similar item having a housing large enough for the container. I have also provided an apparatus which is adaptable to various environments in which it may be positioned. Finally, the device of the present invention is easily mounted in a very sturdy manner to either a cupboard, desk, or the like.

I have provided a carrier arm connected at one end to a housing and at its other end to a receptacle support such as a flat platform or support hook. In connection therewith, I have provided various means connected to the support for maintaining the orientation of the support relative to the housing at the various rotational positions of the carrier arm. As the carrier arm rotates from its position within a cupboard or desk to a position exposing the receptacle support and receptacle attached thereto, the orientation of the receptacle remains in the same relative position to facilitate depositing waste therein. Thus, a wastebasket or other container is not inconveniently oriented or tipped at the various rotational positions of the carrier arm. This orientation of the support and a receptacle carried thereby also facilitate the use of the device in relatively close spaces, such as small cupboards. The arc of the support and receptacle is reduced because of the consistent orientation during rotation from a recessed to an exposed position. This particular aspect of the invention is especially important for positioning containers in a small cupboard.

It should be realized, of course, that the device of the present invention is useful for items other than simple wastebaskets and containers. For example, the support of the device may be used to carry a box of laundry detergent, a bottle of chemicals, or any other carrier of supplies and parts, so long as the receptacle or other item is sufficiently affixed to the receptacle support according to the needs of the material carried.

Operation of the device is effected with an actuator rod. The actuator rod is connected at one end to the carrier arm. At its other end, the actuator rod is either exposed to a person's grip for pushing and pulling the rod or attached to a door or the like. In the latter situation, the opening of the door in the normal manner moves the actuator rod which in turn moves the carrier arm and the platform rotatably attached thereto. This feature of the invention is especially important for positioning a receptacle support in a cupboard or the like.

In a first embodiment of the invention, the means for maintaining the orientation of the receptacle support and container associated therewith comprises a chain and sprocket mechanism. The sprockets are located one at the point of attachment of the carrier arm in the housing and the other at the receptacle support. A chain, such as a linked ball chain, is drawn around the two sprockets tightly. When the carrier arm is rotated by the actuator rod, the chain pays off from one side of each sprocket and proceeds onto the other side of each sprocket. The sprocket attached to the receptacle support rotates about one end of the carrier arm to maintain the same relative orientation of the receptacle support with respect to the housing in which the device is mounted. A partial sprocket drive spring-loaded ball chain can take a significant misalignment of the sprockets without affecting the load on the device.

Conveniently, the carrier arm is formed as an elongated straight middle section having two opposite ends bent perpendicular thereto. These two opposite ends of the carrier arm form the axes of rotation for the device. The end of the carrier arm where the device is mounted to a housing rotates in a manner allowing the carrier arm to move through its arc. The other end of the carrier arm is suitably mounted in a bearing which allows the receptacle support to rotate thereabout.

Of course, the sprockets could be of different a diameter. This would cause the platform to rotate somewhat relative to the cabinet, when moved.

In another embodiment of the invention, the orientation maintaining means comprises a pair of hubs which replace the sprockets of the previously described embodiment. One hub is associated with one end of the carrier arm which is mounted to the housing. This first hub has a surface extending horizontally therefrom. The second hub is mounted to the receptacle support in the same manner as was described for the sprocket. Also, the carrier arm has an elongated central portion and two perpendicular end portions in the manner described above. However, no sprocket indentations are required on the hub and no chain is passed around the sprockets.

Instead of the chain and sprocket mechanism, the support receptacle has means for attaching an orientation arm which extends from the receptacle support to the horizontally extending surface which is attached to the first hub. This orientation rod is rigid and connects to the horizontally extending surface attached to the first hub.

The orientation rod is of a length designed to facilitate maintenance of the orientation of the receptacle support throughout the arc of rotation of the carrier arm. Thus, the orientation rod also swings about an arc, but from an axis at its point of connection to the horizontally extending surface. Thus, the orientation rod operates to exert a force at its point of attachment at the receptacle support. That force maintains the orientation of the receptacle support and any container associated therewith throughout the movement of the receptacle support. Of course, the receptacle support is again moved by the actuator rod which is connected to the carrier arm.

The end of the actuating rod is either conveniently located for gripping or is attached to a cupboard door or the like. The actuating rod may be attached at any convenient point along the carrier arm. However, it is preferable to attach the rod to the carrier arm at a point approximately midway therealong. In this manner, the actuator rod does not need to be moved to a great extent in order to move the carrier arm throughout its designed arc of rotation. My tests have shown that attachment of the actuator rod can be made very close to that end of the carrier arm closest to the housing, without greatly increasing the amount of pressure required to operate the device. Of course, as the actuator rod is attached farther from the housing, the moment of force to actuate the device becomes less, but the actuator rod must be moved a greater distance.

Various types of clamps and other known components may be used to attach the actuator rod to the carrier arm.

In a preferred form of either embodiment of the invention, the device is made adjustable by providing a mount at the housing wall such that the carrier arm is elevated slightly above or below the horizontal during most of its arc of rotation. Also, the mount for the end of the carrier rod adjacent the housing can be provided with a screw or similar adjustment device to vary the angle of the carrier arm relative to the horizontal.

An additional component may be associated with the device where it is mounted in a cupboard having a door. This component comprises an attachment surface at the door of the cupboard. The attachment surface has a series of holes or the like which allow connection of the actuator rod in any of the series of holes. Thus, the travel of the carrier arm can be limited or expanded by moving the point of attachment of the rod to the door.

Preferably, the receptacle support can be a hook or hanger fitted to be received in the support hole of a wastebasket. On the other hand, where the device is used in a cupboard or the like, the receptacle support may be a platform suitably shaped for holding any of various size containers or similar items.

Where the device is used in the environment of a desk recess, a stop may be provided on the push rod to limit the rotation of the carrier arm out from the rotation of the desk.

Testing indicates that, using bearings of polytetrafluoroethylene or nylon and a small ball chain embodiment of the invention, only two pounds of pressure is required to rotate the carrier arm which supports a thirteen pound load thereon or suspended therefrom. This test was performed with the actuator rod at a relatively intermediate position along the carrier arm. By proper adjustment, the pressure can be reduced to less than one pound.

In a universal cabinet embodiment of the invention a centering hook is used with a basket having an eyelet received on the hook. The hook is formed so that the basket or container, by its own weight, naturally centers on and aligns with the cabinet opening. The eyelet is preferably of metal type positioned around an aperture in the basket or container.

It is, therefore, an object of the present invention to provide a device for moving a receptacle into and out of the recess of a housing wherein the device requires only slight pressure to operate even with relatively heavy loads.

It is also an object of the present invention to provide a receptacle moving device which has adjustable features for mounting and operating the device.

It is also an object of the present invention to provide a device for moving a receptacle into and out of the housing of a desk, cupboard, or similar recess while maintaining the orientation of the receptacle and its support with respect to the recess housing.

It is also an object of the present invention to provide a receptacle moving support which is easily mounted to a recess housing and may also be adjustably positioned at the mounting.

It is also an object of the present invention to provide a device for moving a receptacle into and out of a housing recess wherein the receptacle is either supported on a base or depends from a hanger.

It is also an object of the present invention to provide a device which facilitates the use of wastepaper baskets and similar items in offices and industry, thereby saving office floor space and making the office or industrial area more attractive.

It is also an object of the present invention to provide a receptacle carrying device which makes better use of cupboard space, floor space, office space, and industrial work space.

It is also an object of the present invention to provide a device which is suitable for carrying any of various containers and other items between recessed and exposed positions in a desk, cupboard, or the like.

It is also an object of the present invention to provide an orientation arm, chain and sprocket mechanism, belt drive mechanism, or similar device for maintaining the orientation of a waste receptacle or similar item relative to the housing in which it is used during the rotation of the device from a recessed to an exposed or forward position.

These and other objects of the present invention will be better understood by a review of the following description when read in conjunction with the attached drawings.

BRIEF DESCRIPTION OF THE DRAWINGS

In the following description and the attached drawings, like reference numerals refer to like characters throughout the specification and the several views of the drawings, in which:

FIG. 1 is an elevated view, partly in section, showing the device of the present invention with a support base and using a chain and sprocket mechanism in a cupboard environment;

FIG. 2 is an overhead perspective view of the device of the present invention with additional rotational positions of the device shown in phantom;

FIG. 3 is a sectional view through the device shown in FIG. 1;

FIG. 4 is a front view of the chain and sprocket embodiment of the present invention shown with a receptacle hanger in a desk environment;

FIG. 5 is a partial sectional view of the universal joint of the receptacle support hanger of the invention;

DESCRIPTION OF THE PREFERRED EMBODIMENT

Figure 6:
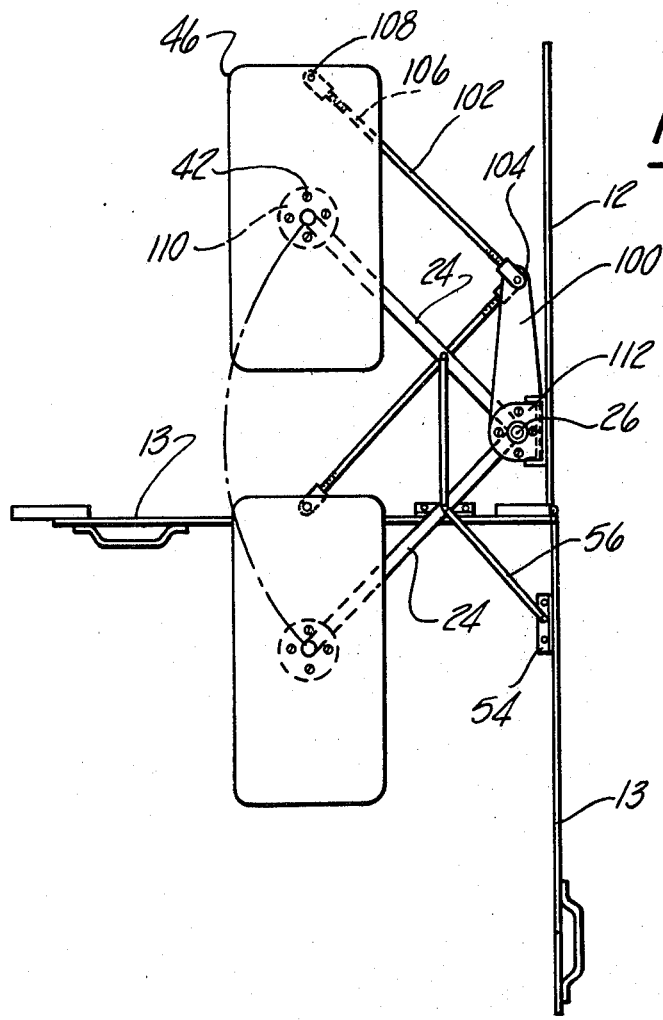
FIG. 6 is an overhead view of the invention using the orientation rod embodiment.

Referring now to FIGS. 1–4 in general, and specifically to FIG. 1, the chain and sprocket embodiment 10 of the invention is thereshown in the environment of a cupboard housing having a side wall 12 and door 13 hinged thereto by hinge 15. The device 10 is mounted to wall 12 by bracket 14 which has a base plate 16 attached to wall 12 by screws 18. A rotation bracket 20 is affixed to the mounting bracket 14 such as by welds 22 (FIG. 3). A carrier arm 24 has a first end 26 perpendicular thereto and rotationally mounted in bracket 20. A combination collar and bushing 28 supports the arm 24 in bracket 20 and a ball chain type sprocket 30 is screwed to the lower horizontal portion 32 of bracket 20. The screws 34 securing sprocket 30 on the end 26 of the carrier arm 24 are more clearly shown in FIG. 3.

Still referring to FIG. 1 specifically as well as to FIGS. 2–4 in general, a ball chain 36 is thereshown as wrapped about the sprocket 30 in a manner so that it is elevated somewhat over the carrier arm 24. A second sprocket 38 is mounted on an opposite perpendicular end 40 of the carrier arm 24 by screws 42. Snap ring 41 secures end 40 in place over bearing surface/bushing 39. The chain 36 is fitted onto sprocket 38 in the same manner as for sprocket 30. The molded sprocket may be formed with indentations along only a part of the circumference of the sprocket thus saving some machining costs. This is possible since a portion of the sprockets are never contacted by the ball chain. The sprockets are conveniently formed of three-quarter inch aluminum.

As more clearly shown in FIG. 3, the other end 40 of the carrier arm 24 is journalled within a combination collar and bushing 44 so that bushing 44 is rotatable about end 40. Sprocket 38 is, however, attached to support surface 46 by screws 42.

Thus, end 26 is rotatable in bracket 20 and the sprocket 38 with attached support surface 46 is rotatable about end 40 of carrier arm 24.

A wastebasket 50 or similar container is shown in phantom in FIG. 1. An analogous wastebasket 52 is shown in FIG. 4 of the drawings.

Door 13 has a bracket 54 attached thereto such as by welding. Metal screws or wood screws may also be used depending on the material of the doors. Bracket 54 has a series of holes along the top thereof such that an actuator rod 56 may be attached with its depending tip 58, to the door 13 in any of the various holes. Actuator rod 56 is also attached to a clip or bracket 60. Alternatively, the actuator rod 56 could be attached directly to the carrier arm 24. However, the bracket 60 is made so that it is adjustable along the length of carrier arm 24. This adjustment allows for a change in the moment of force required to rotate carrier arm 24 about its axis (connecting end 26). Thus, movement of adjustably securable bracket 60 along the length of carrier arm 24 varies the pressure required to close the cabinet door 13 and move the support 46 back into the recess of the housing.

Referring now more specifically to FIG. 2, the support surface 46 is thereshown in the environment of a small cupboard as seen from above and attached to side wall 12. Actuator rod 56 is shown as located in the outermost hole of the bracket 54. The cupboard door 13 and support platform 46 are shown in phantom in an intermediate position and in an open position for the cupboard. The edge 62 of platform 46 maintains a parallel orientation to wall 12 in all three of the positions shown in FIG. 2. This aspect of the invention is important for insuring that the proper access area to the container carried on support surface 46 is always toward the user when the cupboard is open. Of course, this aspect of the invention is especially important when a basket such as wastebasket 52 is hung in the environment of a desk, as shown in FIG. 4. Also, a box having an opening at one end only may also be positioned on the surface 46 so that the opening is always accessible.

As carrier arm 24 rotates about its axis (perpendicular end 26) in a counterclockwise direction as seen from above in FIG. 2, the support surface 46 also rotates about an axis (perpendicular end 40) but in a clockwise direction, counter to the rotation of the carrier arm. This action is caused by the chain and sprocket mechanism of the embodiment shown in FIGS. 1–4 and operates to maintain the position of the support surface and any receptacle carried thereon, in the same relative orientation with respective to the cupboard or other environment with which it is associated.

When a wastebasket 52 is suspended from the device 10 of the present invention in the environment of a desk 64 as shown in FIG. 4, the convenience of the basket is readily appreciated. A person sitting at the desk can merely pull the actuator rod out a small distance which operates to retrieve the wastebasket 52 from its most recessed position in the housing of the desk 64 to its forward position as shown in FIG. 4. Thus, without even looking beneath the desk, a person seated at the desk 64 can merely take an item of trash and deposit it in front of himself with very little effort. The basket 52 is then moved to its recessed position by merely pushing the actuator rod 56 back to the surface of the desk by means of knob 66.

Figure 10:
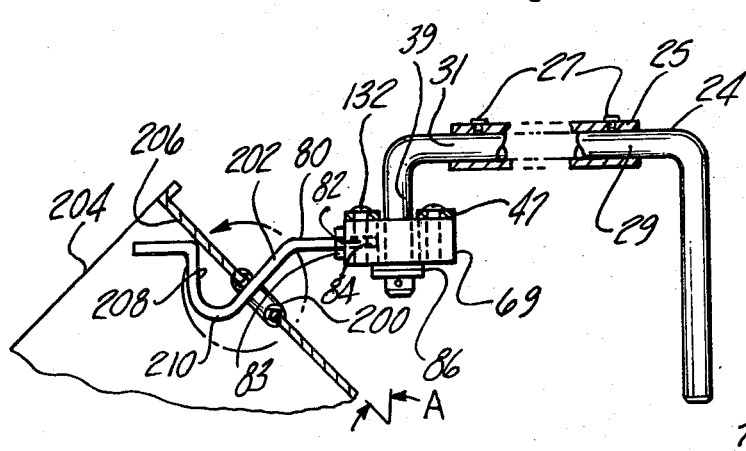
FIG. 10 is a side view of a carrier arm of the invention having a threaded hook for use with containers to be suspended under the top wall of the housing, with the hook shown 90° out of phase for clarity.

Alternative to the particular embodiment shown in FIG. 4, the hub 69 may have a hook 80 extending horizontally therefrom as shown in FIG. 10, rather than a hanger descending directly beneath it. The hook 80 is usable in connection with a wastebasket which has a small hole formed therein to be received over the hook 80. The particular adaptation shown in FIG. 10 is of a universal cabinet design more suitable for use with an area beneath a kitchen sink or the like. Wastebaskets for use with the device in that particular adaptation have a metal eyelet or like attachment in a side wall of the basket to form an aperture for carrying the basket on the hook 80 which extends from the hub 69. The use of a hub 69 rather than a sprocket 68 is explained below.

The travel arm 24 of this universal cabinet embodiment preferably has adjustment means for varying the length thereof according to the cabinet in which it is used. A sleeve 25 has screw holes (not shown) to receive screws 27 therein. A series of screw holes (also not shown) is formed in the opposed sections 29 and 31 of arm 24 to receive screws 27. Thus, the overall effective length of arm 24 may be varied.

Bushing 86 allows free rotation of sprocket 69 around end 39.

Hook 80 is formed with means for centering and aligning a basket suspended thereon. Eyelet 200 is held against angled surface 202 of hook 80. The weight of the baskket 204 forces the top surface of side wall 206 to bear against the top of the relatively vertical surface 208 of hook 80, thereby centering basket 204 and aligning it according to a preset orientation while the basket is suspended at a normal angle A as shown in FIG. 10 due to the center of gravity of the basket. The preset orientation may be the square alignment of a rectangular shaped basket with the cabinet door opening, for example. So long as the bottom curve 210 of hook 80 is at the lowermost position possible, the basket will tend to orient square to the cabinet opening by the action of its own weight. Any other position places the eyelet farther up angled surface 202, which causes the eyelet and basket to descend and become reoriented with respect to the cabinet opening, and thereby align, by its own weight at the same height and same normal angle A due to center of gravity of basket.

The hook 80 has an externally threaded end 82 received in internally threaded bore 84 on carrier arm 24. Jam nut 83 or a wing nut may be used to position and hold hook 80. FIG. 5 shows an alternative hanger mechanism depending from a carrier arm 24. The arm 24 is in the inverted position in the same manner as shown for FIG. 4. The end 40 of the carrier arm 24 passes through the sprocket 68 and has a pin 72 which supports washer 74 to prevent end 40 from releasing the sprocket 68. A universal mechanism 81 is formed within the side walls of sprocket 68. The universal mechanism has a crosspiece 74 and another transverse crosspiece 76 therethrough so that it may freely rotate therein. The depending hook or hanger 70 is joined by means of a connector (not shown) to the crosspiece 76 so as to form a universal joint.

The operation of the chain and sprocket mechanism 10 will now be described briefly to give a better understanding of the rotation of the carrier arm 24 and support surface 46 of the invention such as shown in FIG. 2. With reference to FIGS. 1-3, opening of door 13 moves actuator rod 56 to bring the support surface 46 from the recess of the housing to its forward position. Bear in mind that sprocket 30 is affixed to bracket 32 by screws 34 and sprocket 38 is affixed to the support surface 46 by screws 48. Therefore, the carrier arm end 26 may rotate within the bearing 25 while the support surface 46, sprocket 38, and bearing surface 39 rotate about the opposite end 40 of the carrier bar 24. The rotation of the sprocket 38 and support surface 46 is caused by chain 36.

As door 13 is opened, chain 36 pays off from sprocket 30 at the indentations 19 (FIG. 1) while additional ball links of chain 36 feed onto the previously open indentations 21 on the opposite side of sprocket 30. Meanwhile, sprocket 38 is caused to rotate in a clockwise direction as seen from above from FIG. 2, by the action of chain 36 paying onto the indentations of the sprocket near the door of the cupboard and paying off from the indentations in the sprocket 38 at the rear of the cupboard.

Another preferred embodiment of the present invention is also shown in FIGS. 6-9.

Referring now to FIG. 6, another embodiment of the invention is thereshown with similar components and also including a stationary idler arm or horizontally extending surface 100 which is locked in position with respect to cupboard 12. Also included in this embodiment is an orientation rod 102 which connects at the innermost end 104 of the support surface in a manner so that it may rotate freely therein. The opposite end 106 of the orientation rod 102 is attached to the support surface in a manner so that the support surface may rotate about the point of attachment 108. The point of attachment may be formed as any means suitably allowing motion of the platform between the recessed and extended positions.

A hub 110 is connected to the support surface 46 by screws 42 in the same manner as for the sprocket 38 shown in FIG. 1. However, hub 42 has no indentations for a chain or the like. Carrier arm 24 is connected to hub 42 in the same manner as for the sprockets described above. The opposite end 26 of the carrier arm 24 is similarly rotatably connected to a hub 112 which is mounted to the cupboard 12 as described for the chain and sprocket embodiment of the invention. The actuator rod 56 is shown as directly attached to carrier arm 24 in FIGS. 6-9.

Opening of door 13 causes rotation of carrier arm 24 as well as rotation of orientation rod 102. Thus, the support surface 46 maintains the same relative orientation with respect to the cupboard and its side wall 12 throughout the path of travel of the orientation rod 102 and carrier arm 104.

Once again, a bracket 54 is attached to door 13 so that the actuator rod 56 may be adjustably connected thereto. Furthermore, as shown in FIGS. 8 and 9, the carrier arm 24 may have additional holes 114 for variable attachment of the actuator rod 56 to the carrier arm 24.

Preferably, the orientation rod 102 has threaded ends for attachment and minor adjustment as shown in FIGS. 6-9.

Figure 7:
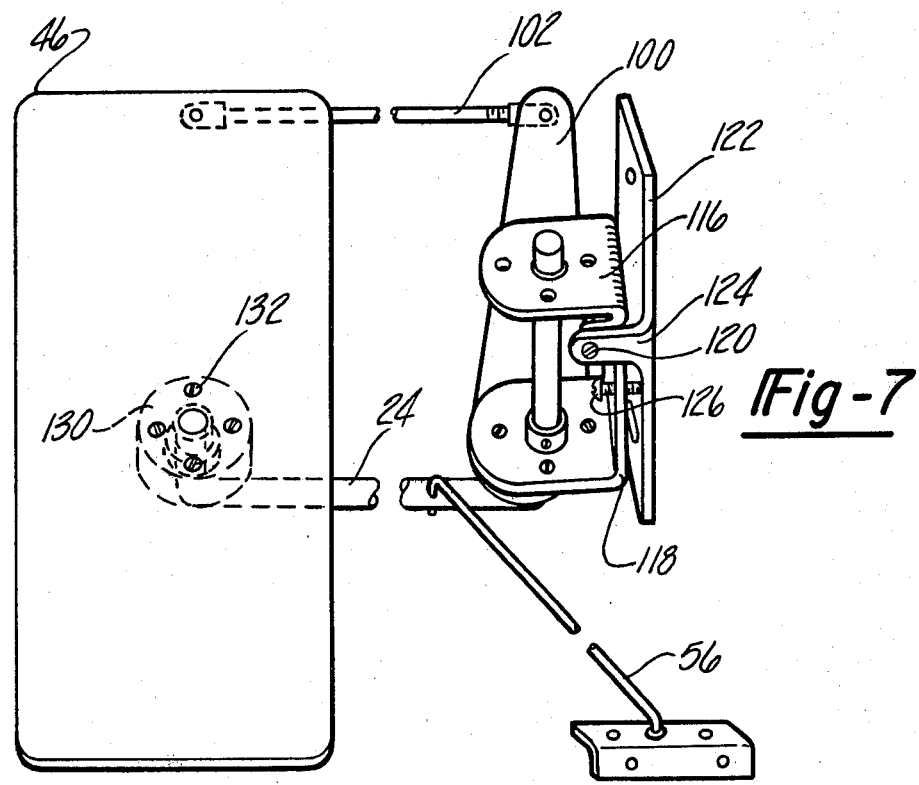
FIG. 7 is a perspective view of the device shown in FIG. 6 with some elements shown in phantom.
Figure 9:
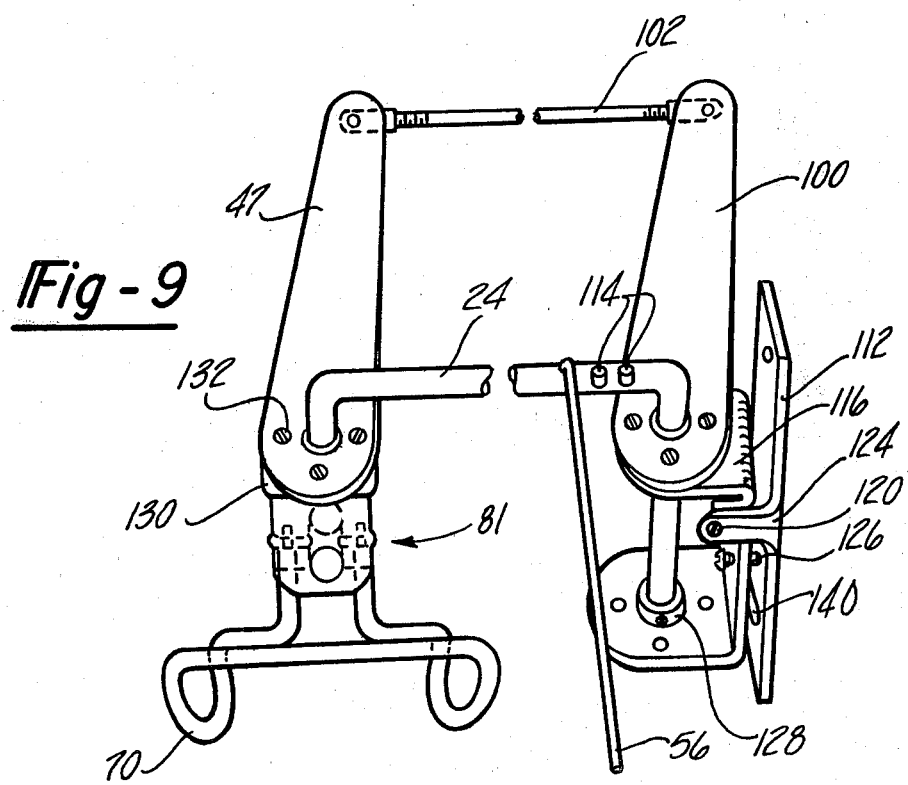
FIG. 9 is a perspective view, partly in section, showing the orientation rod embodiment of the present invention with a basket carrier suspended from the universal joint (in phantom)

The preferred mounting bracket shown in FIGS. 7 and 9 has an upper horizontal portion 116 and a lower horizontal portion 118 hinged and joined by a screw 120. Mounting bracket 122 has a flange 124 extending therefrom to receive screw 120 in the manner shown. Additionally, a screw 126 is provided through the lower section 118 of the mounting bracket. This screw may be adjusted to vary the pitch of the carrier arm with respect to the horizontal. Such an adjustment varies the amount of pressure required to operate the device.

Figure 8:
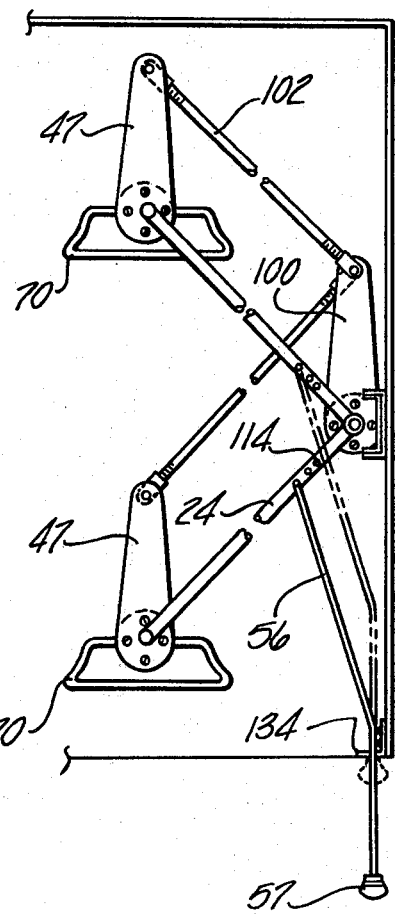
FIG. 8 is a top view of the orientation rod embodiment of the present invention as mounted in a desk housing having an actuator rod with a knob for use as a stop.

FIGS. 8 and 9 show the device of the invention having a hanger 70. FIG. 9 shows the universal mechanism 81 as was described for FIG. 5. A support surface 47 is shown in FIGS. 8 and 9. This surface is provided merely for the connection of orientation rod 102 so as to maintain the relative orientation of hanger 70 and any container or other article suspended therefrom. Adjustment screw 126 is also shown in FIG. 9. Of course, a thumbscrew adjustment could be provided in some environments. A combination thrust lock and collar 128 is also used for a bearing surface at the various positions on the carrier arm, as was described for the chain and sprocket embodiment of FIGS. 1–4. A pitman arm or support surface 47 is connected to a hub 130 by screws 132 in the same manner as the attachment of sprocket 38 in FIG. 1.

FIG. 8 shows a knob 57 attached to actuator rod 56. The actuator rod 56 is bent at an angle to facilitate retrieval and replacement of the hanger 70 from the position shown in full lines to the phantom position. The small plate 134 at the front of a desk or other cabinet operates as a stop for the knob 57 on actuator rod 56. This limits the travel of the carrier arm 24 from within the recess of the housing shown in FIG. 8.

A slot 140 is formed in mounting bracket 112 so that the bracket may be adjustably mounted at various angles so as to vary the angle of the carrier arm relative to the horizontal. Thus, the bracket may be so mounted that the carrier arm moves either upwardly toward the rear of the cabinet or upwardly toward the front of the cabinet. This also allows for an adjustment to guard against oilcanning of side walls for metal cabinets and the like.

Although preferred embodiments of the present invention have been described and shown, it will be apparent to those skilled in the art that it is possible to vary certain aspects of the invention such as the type of materials used and the formation of the support surface for hanger, without departing from the scope or spirit of the invention as defined in the appended claims.

What I claim is:

1. A device for moving a receptacle into and out of a housing, said device comprising:
   means for mounting the device to the housing;
   a receptacle support;
   a carrier arm rotatably connected at one end to said housing and rotatably connected at the other end to said support;
   an actuator rod connected to said arm and movable into and out of said housing so as to rotate said arm about said one end;
   means connected to said support for maintaining the orientation of said support relative to the housing at all rotational positions of said arm;
   whereby a receptacle may be moved into and out of said housing while being maintained in the same orieintation relative to the housing regardless of the position of said arm; and
   wherein said maintaining means comprises a first sprocket affixed to said housing and connected to said one end of said arm so that said arm is rotatable in said first sprocket;
   a second sprocket connected to the other end of said arm and affixed to said support so that said second sprocket and said support affixed thereto are rotatable about said other end; and
   a chain mounted on and indexing on said sprockets, whereby said chain plays onto and off from the sprockets with movement of the actuator rod thereby maintaining the orientation of the receptacle.

2. The invention as defined in claim 1 wherein each of said first sprocket and said second sprocket have concave chain-receiving indentations and said chain comprises a connected series of balls receivable in said indentations.

3. A device for moving a receptacle into and out of a housing, said device comprising:
   means for mounting the device to the housing;
   a receptacle support;
   a carrier arm rotatably connected at one end to said housing and rotatably connected at the other end to said support;
   an actuator rod connected to said arm and movable into and out of said housing so as to rotate said arm about said one end; and
   means connected to said support for maintaining the orientation of said support relative to the housing at all rotational positions of said arm;
   whereby a receptacle may be moved into and out of said housing while being maintained in the same orientation relative to the housing regardless of the position of said arm.

4. The invention as defined in claim 3 wherein said support comprises a platform adapted to carry a receptacle thereon.

5. The invention as defined in claim 3 wherein said support comprises a hanger adapted to support a receptacle depending therefrom.

6. The invention as defined in claim 3 wherein said maintaining means comprises an indexing arm attached at one end to said support and at its other end to the housing so as to cause a rotation of said support about said other end of the carrier arm and counter to the rotation of said carrier arm at said one end thereof, thereby maintaining the orientation of said support with respect to the housing.

7. The invention as defined in claim 6 wherein said maintaining means further comprises a horizontally extending flange affixed to said mounting means and wherein said indexing arm is rotatably attached to the flange.

8. The invention as defined in claim 3 wherein said housing has a door and said actuating rod is attached thereto.

9. The invention as defined in claim 8 wherein said door includes means for varying the position of attachment of said rod to said door thereby varying the movement of said support out from and into said housing.

10. The invention as defined in claim 3 wherein said housing has an aperture through which said actuating rod slides such that said actuating rod is movable from outside the housing.

11. The invention as defined in claim 3 wherein said receptacle is suspended and further comprising means for maintaining the alignment of the orientation of the receptacle relative to the housing.

12. The invention as defined in claim 11 wherein said receptacle is a basket having an eyelet and wherein said maintaining means comprises a hook connected to said carrier arm and receiving the eyelet thereon to support the basket, said hook having a first substantially vertical surface and a second inclined surface allowing the eyelet to descent thereon to align the basket.

* * * * *